United States Patent
Fredricks (10) Patent No.: US 7,710,253 B1
(45) Date of Patent: May 4, 2010

(54) LED AVIATION WARNING LIGHT WITH FAULT DETECTION

(75) Inventor: Thomas M. Fredricks, Westbrook, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 33 days.

(21) Appl. No.: 12/284,908

(22) Filed: Sep. 26, 2008

Related U.S. Application Data (63) Continuation of application No. 11/363,389, filed on Feb. 27, 2006, now Pat. No. 7,429,917.

(51) Int. Cl.
*B60Q 1/50* (2006.01)

(52) U.S. Cl. .................. 340/464; 340/815.45; 340/945; 315/76; 324/500

(58) Field of Classification Search ............ 340/815.45, 340/945, 464, 564, 660, 981, 971; 315/76; 324/500
See application file for complete search history.

(56) References Cited

U.S. PATENT DOCUMENTS

| | | | | |
|---|---|---|---|---|
| 5,313,165 A | * | 5/1994 | Brokaw | 340/661 |
| 5,347,224 A | * | 9/1994 | Brokaw | 340/458 |
| 5,397,963 A | * | 3/1995 | Manson | 315/129 |
| 5,475,371 A | * | 12/1995 | Dunk et al. | 340/660 |
| 5,625,260 A | * | 4/1997 | Millgard | 315/136 |
| 6,956,494 B2 | * | 10/2005 | Tichborne et al. | 340/815.45 |
| 7,116,294 B2 | * | 10/2006 | Stopa | 345/82 |
| 2002/0043943 A1 | * | 4/2002 | Menzer et al. | 315/291 |
| 2003/0209997 A1 | * | 11/2003 | St. Germain et al. | 315/291 |
| 2004/0041702 A1 | * | 3/2004 | Toulmin et al. | 340/500 |
| 2007/0040696 A1 | * | 2/2007 | Mubaslat et al. | 340/657 |
| 2007/0108843 A1 | * | 5/2007 | Preston et al. | 307/112 |

* cited by examiner

*Primary Examiner*—Eric M Blount
(74) *Attorney, Agent, or Firm*—Alix, Yale & Ristas, LLP (57) ABSTRACT

An embodiment of an LED warning light includes a plurality of LED banks, each including a series of light emitting diodes. The LED warning light monitors an operational parameter of each LED bank to detect failure of an LED and produce a fault indication. The LED warning light includes a microcontroller programmed to evaluate the fault indications and take one or more pre-determined failure mode actions. Failure detection and failure mode actions are defined by program steps taken by firmware running in the microcontroller. Failure mode actions may include increasing the current delivered to remaining LED banks to compensate for the loss of luminance from the LEDs in a failed LED bank. Multiple bank failures may require shutting down the LED warning light to provide an obvious indication that the warning light is no longer in compliance with relevant regulations.

18 Claims, 9 Drawing Sheets

LED AVIATION WARNING LIGHT WITH FAULT DETECTION

REFERENCE TO RELATED APPLICATIONS

This application is a continuation in part of U.S. patent application Ser. No. 11/363,389 filed Feb. 27, 2006 now U.S. Pat. No. 7,429,917, the entire contents of which are hereby incorporated by reference.

BACKGROUND

The disclosure relates generally to external lighting for aircraft and more particularly to an LED aviation warning light incorporating redundancy and fault detection features.

Civilian air traffic control agencies such as the FAA specify standards for aircraft external lighting. Aircraft operating at night in civilian airspace are required to display lights to attract the attention of other aircraft operating in the same airspace. These external aircraft lights include flashing anti-collision lights mounted on the aircraft's upper and lower fuselage, as well as position/navigation lights on the tail and the wing tips. The location, color, intensity and light radiation pattern for each particular light is typically specified by the relevant regulation.

Aircraft external lights have previously employed gaseous discharge "strobe" or incandescent light sources. Incandescent and strobe lamps suffer from relatively high power consumption and relatively short service life.

With advances in the efficiency of light output from light emitting diodes (LEDs), it is now possible to replace incandescent and strobe lamps with LED light sources. LED light sources are attractive because of their extremely long service life and relatively low power consumption. Commercially available high-output LEDs in certain configurations can achieve the required light output and radiation pattern for aircraft external lighting.

Strobe and incandescent light sources typically employed a single light source, making failure of that light source readily apparent upon inspection. While failure was readily detectable, it also required taking the aircraft out of service until the failure could be repaired. Any failure that requires taking an aircraft out of service adversely impacts profitability and customer service.

An LED light source may employ multiple LED light sources due to the relatively low quantity of light produced by each LED. If all of the LEDs are arranged in series, an open circuit failure of any individual LED would extinguish the entire light. Alternatively, subsets of LEDs could be arranged in a series/parallel configuration such that failure of any one LED would extinguish only the LEDs in that series branch, with the remaining LEDs continuing to operate. This type of redundancy prevents total failure of the light assembly. However, partial failure of an aircraft warning light may result in a light that fails to meet the requirements of the relevant regulation, while appearing to function normally to the typical observer/inspector. There is a need in the art for an LED aviation warning light configured to continue to function after failure of one or more LEDs that is also configured to detect failure of the LED light sources and provide some indication of that failure.

SUMMARY

It is accordingly an object of the invention to provide an LED warning light that detects failure of one or more LEDs in the warning light and is programmable to take one or more predetermined failure mode actions.

An LED warning light according to aspects of the disclosure includes a plurality of LED banks, each bank including two or more light emitting diodes connected in series. A bank driver circuit is arranged to apply a drive current to each LED bank in response to a first input and to interrupt current to each LED bank in response to a second input. A bank sense circuit is connected to sense current flow through each LED bank and produce a first output indicative of normal current flow through the LED bank or a second output indicative of abnormal current flow through the LED bank. A microcontroller is programmed to produce the first and second inputs to the bank driver circuits and responsive to the presence of the second output to take a predetermined failure mode action.

Failure detection and failure mode actions are defined by program steps executed by firmware running in one or more microcontrollers. For example, the firmware may be configured to compensate for noise or spurious signals in the warning light to reduce the likelihood of false failure indications. Failure mode of the warning signal light is flexibly configurable by modification of the firmware. Examples of failure mode actions are shutting off the LEDs, changing the pattern of inputs to the bank driver circuits or generating a local failure indication or remotely detectable failure signal.

An alternative LED warning light according to aspects of the present disclosure includes reserve illumination capacity that is activated upon detection of an LED bank failure. Activation of reserve illumination capacity allows the LED warning light to continue to meet all relevant illumination requirements, reducing aircraft downtime. Reserve illumination capacity may be provided by incorporating more banks of LEDs than are required for a particular zone of illumination. Under normal (non-failure) operating conditions, one or more banks of LEDs may be held in reserve or all the banks of LEDs may be driven at a reduced current. Upon detection of a bank failure in a particular illumination zone, the reserve illumination capacity is activated by applying power to reserved bank(s) of LEDs or increasing the power delivered to remaining banks of LEDs. In addition to activating the reserve LED capacity, the LED warning light may also activate one or more fault indicators, such as an LED of a distinctive color or an electronic failure signal. The fault indicator LED may also be activated in a high visibility flashing pattern. Wired or wireless fault indications may be provided to aircraft or inspection systems.

It will be apparent that an LED warning light may experience a failure in more than one LED bank in a particular illumination sector or zone. In such a scenario, the reserve illumination capacity would be insufficient to make up for the failure of the second bank and the LED warning light will no longer meet the relevant FAR requirements. An alternate failure mode for an LED warning light experiencing multiple bank failures in a single illumination zone shuts the remaining banks in the warning light off and illuminates the fault indicator in a pre-determined pattern that may be different from the failure mode in which the reserve illumination capacity is used to keep the LED warning light in compliance with FAR requirements. In this failure mode, the LED warning light is inoperative, providing an apparent indication of failure, supplemented by the fault indicator.

Several aspects of the disclosure are described herein with reference to exemplary embodiments for purposes of illustration. Specific details, relationships, materials, methods and features are set forth to provide a full understanding of the disclosed embodiments and should not be considered essen-

DETAILED DESCRIPTION

Figure 1:
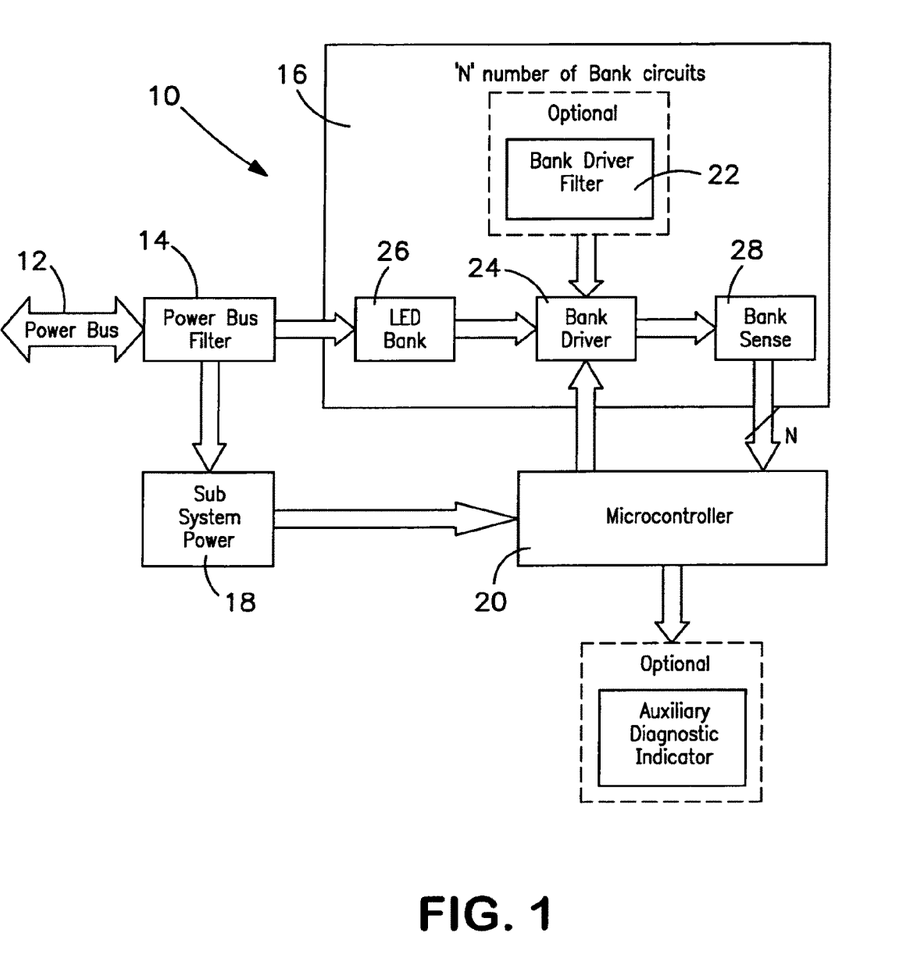
FIG. 1 is a functional block diagram of an embodiment of an LED aviation warning light according to aspects of the present invention.

An embodiment of an LED aviation warning light will now be described with reference to FIGS. 1-5, wherein like numbers refer to similar parts. FIG. 1 is a functional block diagram of an exemplary LED aviation warning light 10 according to aspects of the disclosure. The LED aviation warning light 10 is connected to a power bus 12 of an aircraft through a power bus filter 14. Filtered electrical power is delivered to "N" LED bank circuits 16, one for each series bank or branch of LEDs in the warning light. Electrical power is also delivered to a subsystem power circuit 18 that produces regulated low voltages (5 VDC, 8 VDC) for use by the microcontroller 20 and associated circuitry.

Each bank circuit 16 may include a bank filter 22. Filtering between the electrical system and the aviation warning light 10 and/or bank circuits 16 protects the warning light from voltage spikes in the aircraft electrical system and also prevents noise from the warning light from feeding back into the aircraft electrical system.

Each bank circuit 16 includes a bank driver 24 configured to provide a constant current sinking path from each LED bank 26 to ground. The bank drivers 24 are controlled by the microcontroller 20. Bank sense circuits 28 are arranged to produce a first input to a microcontroller indicating normal current flow through each LED bank 26 or a second input to the microcontroller corresponding to a failure detected in an LED bank 26 and/or bank driver 24. Upon detection of a failure in an LED bank 26 and/or bank driver 24, the microcontroller 20 is programmed to take one of several possible actions, including providing a diagnostic indicator of the failure.

Figure 2:
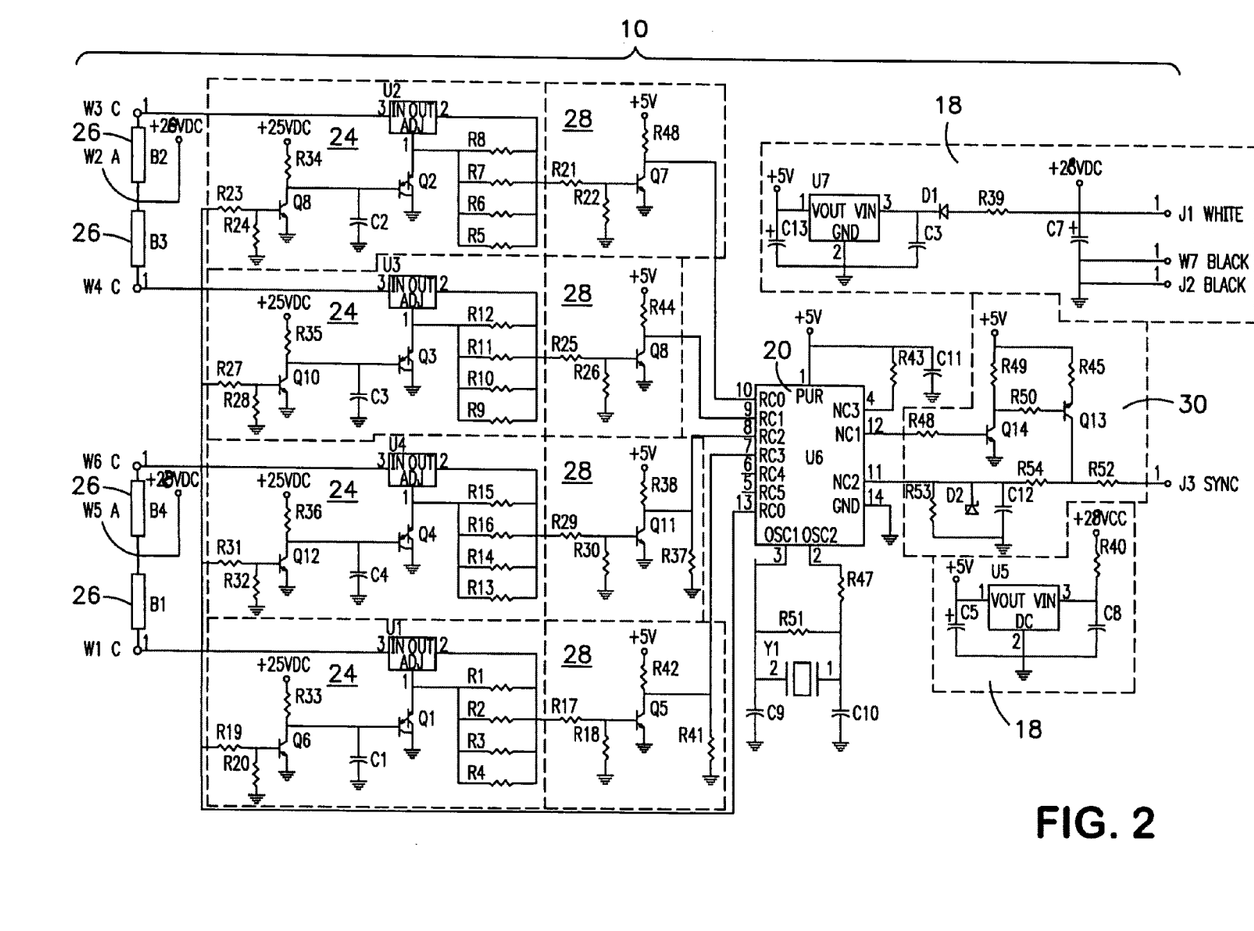
FIG. 2 is a schematic of the LED aviation warning light of FIG. 1.

A schematic of an exemplary LED aviation warning light 10 is shown in FIG. 2. LED banks B1, B2, B3, B4 are shown connected between filtered 28 VDC aircraft power and a bank circuit. Each bank driver 24, includes a voltage regulator (U1, U2, U3, U4) arranged in a constant current configuration through respective Darlington pair transistors (Q1, Q2, Q3, Q4). Each Darlington pair transistor (Q1, Q2, Q3, Q4) is controlled by a transistor (Q6, Q8, Q10 and Q12, respectively), which are in turn controlled by a common signal from the microcontroller 20 (U8). The current flow path through each LED bank 26 passes through the input and output of the voltage regulator (U1, U2, U3, U4), a 4 resistor network and the Darlington pair transistor (Q1, Q2, Q3, Q4) to ground.

Bank sense circuits 28 employ transistors (Q5, Q7, Q9 and Q11) to sense current flow in the current flow path and provide a fault indication to microcontroller 20 (U6) in the absence of current flow through an LED bank. It will be understood that an open circuit failure of an LED in the series of LEDs of an LED bank will result in an open circuit and the current flow through the bank having a failed LED will drop to zero. In the illustrated circuit, a logic level high at microcontroller inputs RC0, RC1, RC2, and RC3 indicates normal functioning of LED banks B1 through B4. Absence of current flow through the 4 resistor network of a respective bank driver will turn off the failure detection transistor (Q5, Q7, Q9 or Q11) corresponding to the failed bank and result in a logic level low at the corresponding input of the microcontroller.

The microcontroller 20 is provided with 5 VDC power from the sub-system circuit 18. 8 VDC is provided to a synchronization circuit 30. The synchronization circuit allows the flash pattern of multiple LED aviation warning lights to be synchronized. The synchronization feature does not form part of the present invention and will not be described in any greater detail herein. Microcontroller 20 is provided with clock pulses at a low frequency of 32.768 KHz to minimize production of high frequency RF noise.

Figure 3:
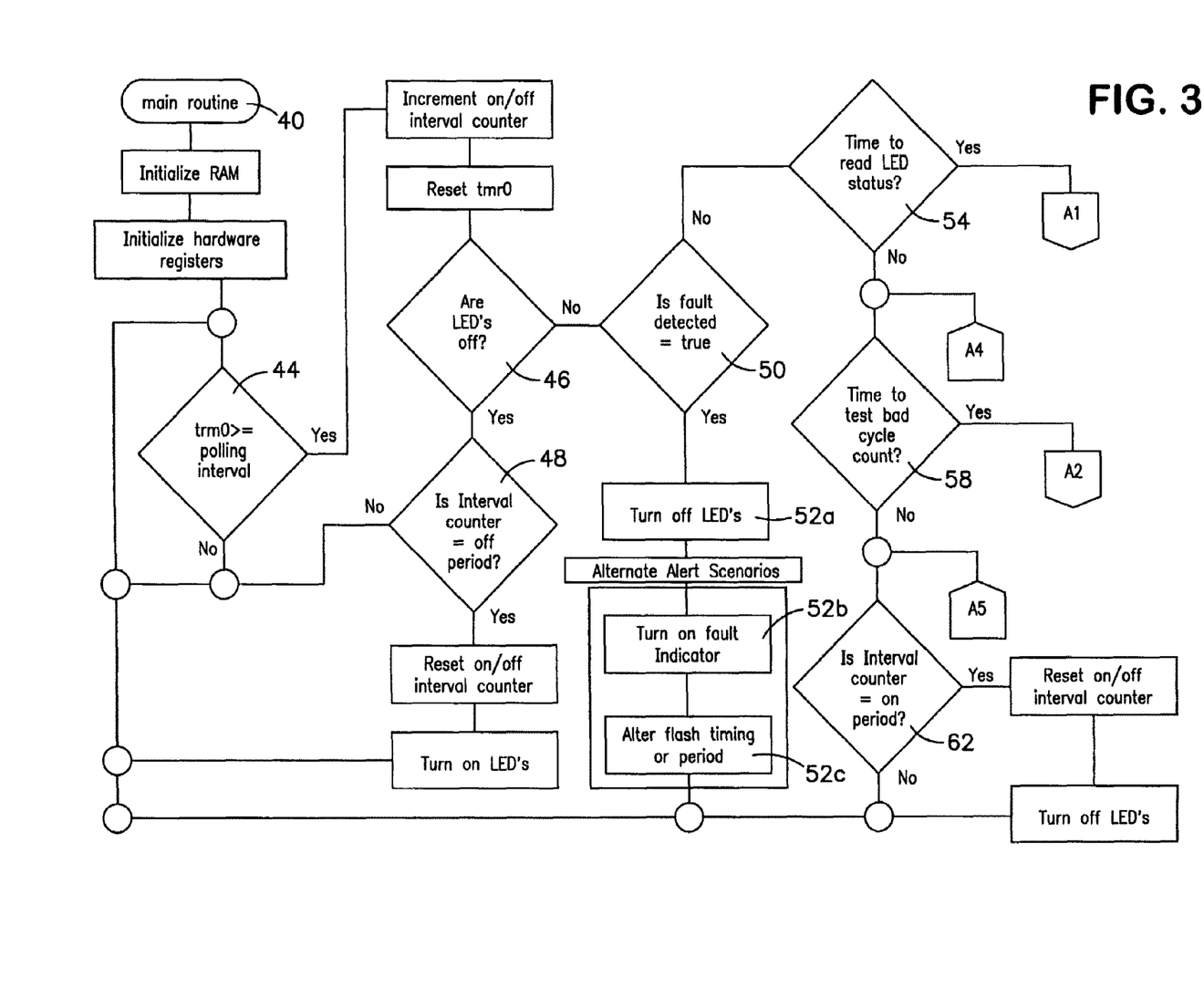
FIG. 3 is a software flow chart for a microcontroller program for use in the LED aviation warning light of FIGS. 1 and 2.
Figure 4:
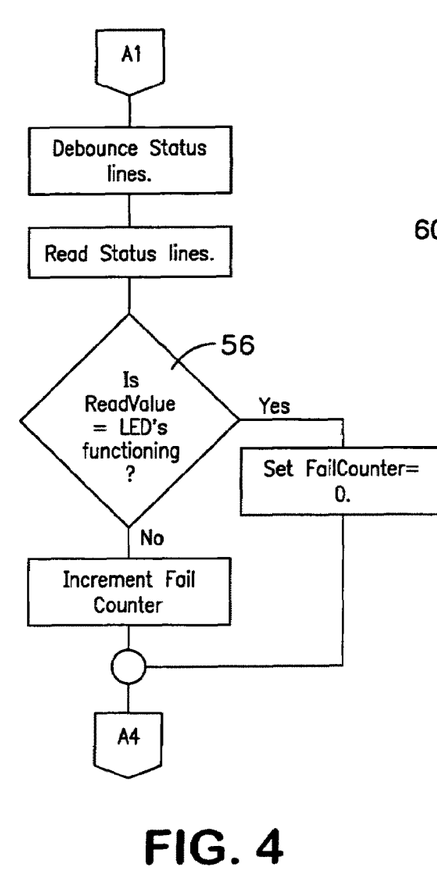
FIG. 4 is a flowchart of a subroutine for use in conjunction with the microcontroller program of FIG. 3.
Figure 5:
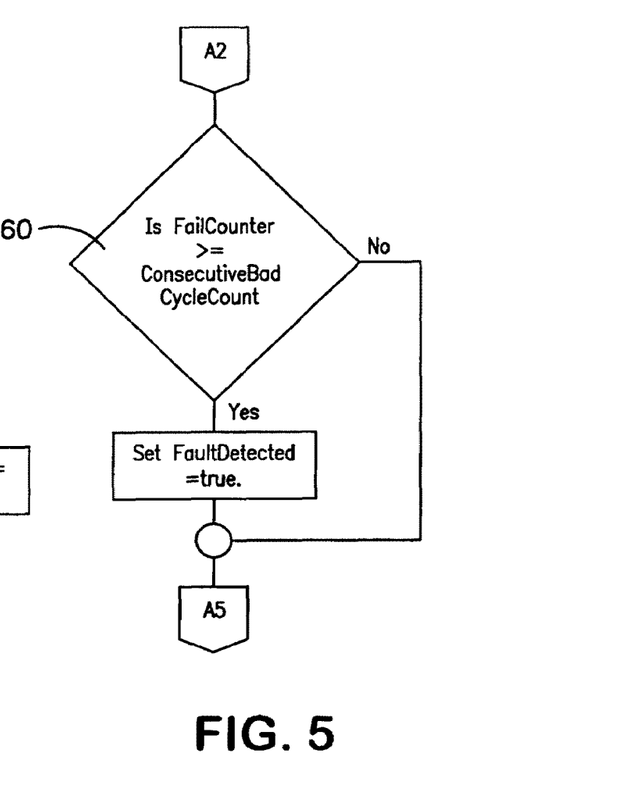
FIG. 5 is a flowchart of a subroutine for use in conjunction with the microcontroller program of FIG. 3.

Relevant portions of the software of microcontroller 20 will now be discussed with reference to FIGS. 3-5. The software routine is of the polling type, running in a continuous loop. FIG. 3 illustrates a flowchart of the main polling routine 40. On power up, the software initializes the RAM and hardware registers of the microcontroller. The main routine 40 then checks a polling interval and resets a polling interval counter. The software then checks whether the LEDs are off. If the LEDs are off, the answer at 46 is yes and the software proceeds to check whether the interval counter equals the off period at 48. If not, the software proceeds to increment the interval counter and reset the timer to zero. If the interval counter equals the off period at 48, the main routine resets the on/off interval counter and turns on the LEDs. At the next polling increment the answer at 46 is no, i.e., the LEDs are on. The main routine proceeds to check if the fault detected equals true at 50. If fault detected equals true at 50, the microcontroller is programmed to take a predetermined action.

FIG. 3 illustrates several alternative actions such as turning off the LEDs 52a, turning on a fault indicator 52b, or altering the flash timing or period 52c. Failure mode of the present LED aviation warning light will be discussed in greater detail below. If the fault detected is not true at 50, the routine queries whether it is time to read LED status at 54. If the answer at 54 is yes, the main routine proceeds to subroutine A1 illustrated in FIG. 4. Subroutine A1 includes the step of debouncing the status lines (RC0, RC1, RC2, RC3 inputs to microcontroller 20 (U6)). Debouncing is a software routine that checks the condition of the status line over a period of time to eliminate spurious inputs such as voltage spikes or noise. Subroutine A1 then reads the status lines. At 56 the subroutine checks whether the read value indicates proper functioning of each LED bank. If the answer at 56 is yes, a failure counter is set to zero and the subroutine returns to the main routine at A4. If the answer at 56 is no, the subroutine increments the failure counter and returns to the main routine at A4. The main routine then checks at 58 to see if it is time to test the bad cycle count. If the answer at 58 is yes, the main routine enters subroutine A2 shown in FIG. 5.

Subroutine A2 compares the fail counter incremented in subroutine A1 to a predetermined consecutive bad cycle count at 60. The consecutive bad cycle count allows the failure detection function of the present invention to ignore momentary or spurious conditions affecting an LED bank by setting the consecutive bad cycle count in excess of 1. Typically, the consecutive bad cycle count will be set between 2 and 10. When the fail counter is incremented in subroutine A1 to the point where it equals the predetermined consecutive bad cycle count at 60, subroutine A2 sets the fault detected to true and returns to the main routine at A5. If the answer at 60 is no, the subroutine returns to the main routine at A5.

The main routine checks whether the interval counter equals the on period at 62. If yes, the on/off counter is reset, the LEDs are turned off and the main routine returns to step 44. It can be seen that the outcome of the fault detection query at 50 is determined by subroutines A1 and A2 which are in turn responsive to the condition of microcontroller inputs RC0 RC1, RC2 and RC3. The bank sense circuits 28 determine the status of inputs RC0, RC1, RC2 and RC3, as shown in FIG. 2.

For many practical reasons, it is desirable to configure an LED aviation warning light to drive multiple series strings, or banks of LEDs. One result of driving individual banks of LEDs is that failure of an LED in one bank will not extinguish the LEDs of the remaining banks. Thus it is possible for one or more banks of such an LED aviation warning light to fail, resulting in a reduced light output. To most observers, the LED aviation warning light will appear to be functional, but the warning light may not meet the specified light output.

To avoid the situation where such a partially failed LED aviation warning light continues in service for an extended period, the disclosed LED aviation warning light includes a failure detection circuit as discussed above. It is possible to configure failure detection circuits using discrete components. However, a failure detection circuit constructed of discrete components having the capability shown in subroutines A1 and A2 would be exceedingly complex. Further, employing a programmable microcontroller permits alteration of the subroutines, main routine, and/or failure mode function without alteration of the LED aviation warning light hardware. For example, the consecutive bad cycle count could be raised or lowered to allow the failure detection to ignore anomalies present in the circuit.

One or more failure mode actions may be programmed into the microcontroller. One possible failure mode action would be to turn off all the banks of LEDs, giving a positive indication of failure resembling failure of a prior art strobe or halogen light source. An alternate failure mode action would be to produce an electronic failure signal. Currently, aviation wiring systems are not equipped to receive such a fault indication. Such a fault indication might be converted to a visual signal by turning on a fault indicating LED located on the LED aviation warning light housing or otherwise visible to an inspector. A further alternative failure mode may include altering the flash timing or period of the aviation warning light as an alternative positive indication of failure.

An alternative LED aviation warning light according to aspects of the disclosure is illustrated in FIGS. 6-11. The alternative LED aviation warning light includes a lighthead 70 illustrated in FIGS. 6-9 and a current source 100 illustrated in FIGS. 10A, 10B and 11. The warning lights, power supplies and control circuitry described in this application are configured to operate at 28 VDC or lower DC voltages. Smaller, general aviation aircraft typically employ 28 VDC electrical systems, while larger commercial or military aircraft use 110 VAC electrical systems operating at 400 Hz. It will be understood that AC electrical power must be converted to an appropriate DC voltage for use by the disclosed systems. Power conversion for this purpose is well understood and will not be described in further detail. It will also be understood that connections between the aircraft electrical system and the disclosed LED aviation warning lights may include filters and protection against voltage spikes as is known in the art.

FIGS. 6-9 illustrate the lighthead 70 of a second exemplary LED aviation warning light configured for placement behind a lens forming the leading edge of an aircraft wing tip and configured to serve as an anti-collision light and a position light. Federal aviation regulations (FARs) require that commercial and civilian aircraft be equipped with anti-collision, position and navigation lights meeting particular color, light distribution and intensity specifications. Generally speaking, FARs require aircraft to display warning lights forming a pattern surrounding the aircraft. Such patterns may be divided into sectors or angles, with several warning lights configured as a system to provide the required 360° pattern surrounding the aircraft. Some lights are intended to be visible only from particular vantage points, such as navigation or position lights. Anti-collision lights are flashing red or white lights whose intensity is measured in effective candelas. Position lights mounted to the leading edge of a wing tip produce a steady green-light on the right side of the aircraft and a steady red light on the left side of the aircraft. Each light in an aviation warning light system is required to meet the relevant color, intensity and light distribution pattern for its sector, which may be referred to as a "dihedral angle." For purposes of this application, a dihedral angle is an angle formed by two intersecting vertical planes.

The illustrated embodiment of lighthead 70 includes an anti-collision light portion 72 and a position light portion 74. The anti-collision light portion 72 is configured to produce a flashing light signal of the required intensity over a dihedral angle of 120° to the left or right, respectively, of the aircraft. The position light portion 74 is configured to produce a steady red or green light signal of the required intensity over a dihedral angle of 110° to the left or right, respectively, of a plane parallel to the longitudinal axis of the aircraft.

In the disclosed lighthead 70, PC boards 78, 79, 80, 81 are mounted in thermal contact with the aluminum base 76 and provide a thermal path to conduct heat from the LED lamps 82 to the base 76, which acts as a heat sink. The PC boards may be fiber boards with thermal features (metal plated vias or copper studs) or metal core PC boards. The LED lamps used in the disclosed lighthead 70 are XLamp® LEDs available from Cree, Inc. of Durham, N.C., although other high output LED lamps may be suitable. The anti-collision light portion 72 includes a pair of surfaces configured with PC boards 78, 79, each with eighteen (18) LED lamps 82. The eighteen (18) LED lamps 82 on each PC board 78, 79 in the anti-collision light portion 72 are arranged substantially identically, resulting in a symmetrical light distribution pattern as required by the relevant FAR. Each group of eighteen (18) LED lamps on PC boards 78 and 79 are electrically connected in three series strings or banks (B1, B2, B3; B4, B5, B6), each LED bank having six (6) LED lamps. The planar surfaces of the base 76 are arranged to produce the required illumination pattern, taking into account the radiation pattern and intensity of the selected LED lamps and the position of the lighthead 70 with respect to the longitudinal axis of the aircraft. The position of the aviation warning light with respect to the leading edge of the wing or other aircraft component as well as the shape and refraction of any lens or cover are also factors which must be considered.

The position light portion 74 of the lighthead 70 includes a pair of surfaces configured with PC boards 80, 81, carrying eight (8) and four (4) LED lamps 82, respectively. This arrangement of LED lamps reflects that the position light intensity requirement is asymmetrical, e.g., the position light intensity requirement is greatest along the longitudinal axis of the aircraft and declines as the angle of measurement increases to the right or left of the longitudinal axis. When the lighthead 70 is installed in the aircraft wing, PC board 80 and its eight (8) LED lamps 82 face approximately along the longitudinal axis of the aircraft, while PC board 81 and its four (4) LED lamps 82 face generally in the outboard direction. The twelve (12) LED lamps dedicated to the position light function are electrically connected in two series strings or banks B7, B8 of six (6) LED lamps, each LED bank having four (4) LED lamps on PC board 80 and two (2) LED lamps on PC board 81. In this configuration, the proportion of LED lamps filling a particular sector of the position light pattern is maintained in the event of a failure in one of the two banks B7, B8.

The thirty six (36) LED lamps dedicated to the anti-collision light function are divided into two groups of eighteen (18) LED lamps. In the disclosed lighthead 70 anti-collision portion 72, each group of eighteen (18) LED lamps is arranged on one of the PC boards 78, 79, with one group of LED lamps generally oriented in a forward direction and the other group of LED lamps generally oriented in an "outboard" direction. The term "outboard" as used in this application refers to a direction away from the longitudinal axis of the aircraft.

According to aspects of the present disclosure, each group of LED lamps is intentionally configured with more than enough LED lamps to meet the relevant illumination requirement for a sector or zone of the illumination pattern. This provides a reserve illumination capacity which is available in the event that an open circuit failure of an LED lamp (or other failure) extinguishes an LED bank. For example, the light intensity and distribution required to meet the anti-collision light FAR in the sector associated with each group of eighteen (18) LED lamps can be met by twelve (12) of the same LED lamps having the same directional orientation driven at a higher current. LEDs are current driven devices which respond to increased current by generating increased luminous flux in a manner known in the art. For purposes of this example, assume the selected LED lamps 82 have a maximum safe operating current of 1 A (1000 mA) and that LED lamps driven at the maximum safe operating current produce 100% of the rated luminous flux. Those skilled in the art are aware that there are a number of variables relevant to calculating the current that can safely be applied to an LED in any particular design. These variables include, but are not limited to, the type of LED, the thermal design of the assembly in which the LED is used, air circulation around the assembly, the use environment (cold or hot), and whether the LED is continuously on or flashing. As used in this application, "maximum safe operating current" refers to a current which is calculated according to sound design principles to account for these variables. The maximum safe operating current is a current which, in the context of a particular design, will not result in overheating or premature failure of the LED.

According to aspects of the present disclosure, when all the LED banks (B1, B2, B3 or B4, B5, B6) in a group are operational, which will be referred to in this application as the "normal mode", the LED banks are driven at a reduced current selected to produce a reduced luminous flux of approximately two thirds (⅔) of the luminous flux produced by the LED lamps when driven at the maximum safe operating current. When failure of an LED bank is detected, the current applied to the remaining LED banks in the group is increased to the maximum safe operating current, providing an increase in luminous flux sufficient to make up for the loss of the failed LED bank. This operational mode is referred to in this application as the "redundant mode." Since the other banks in a group have the same orientation as the failed LED bank, the illumination requirement for the sector associated with that group of LED lamps can be met with the remaining LED banks driven at a higher current.

This strategy provides redundancy to ensure that the disclosed LED aviation warning light will continue to produce sufficient light to meet the relevant FAR and the aircraft may be kept in service. The disclosed LED aviation warning light is configured to detect failure of an LED bank and activate the reserve illumination capacity so that the LED aviation warning light continues to meet the illumination requirements of the relevant FAR. The disclosed LED aviation warning light is also configured to provide a positive failure indication to an inspector, even though the LED aviation warning light is fully operational using its reserve illumination capacity, e.g., in its "redundant mode." It should be noted that at no time are the LED lamps 82 exposed to a drive current in excess of the maximum safe operating current and are predominantly driven at current levels well below the maximum safe operating current.

An alternative configuration of reserve illumination capacity would provide an additional bank of LED lamps, but only activate the reserve LED bank in the event of a detected failure. Such a configuration would need to test the reserve bank periodically to ensure it had not failed.

Figure 10A:
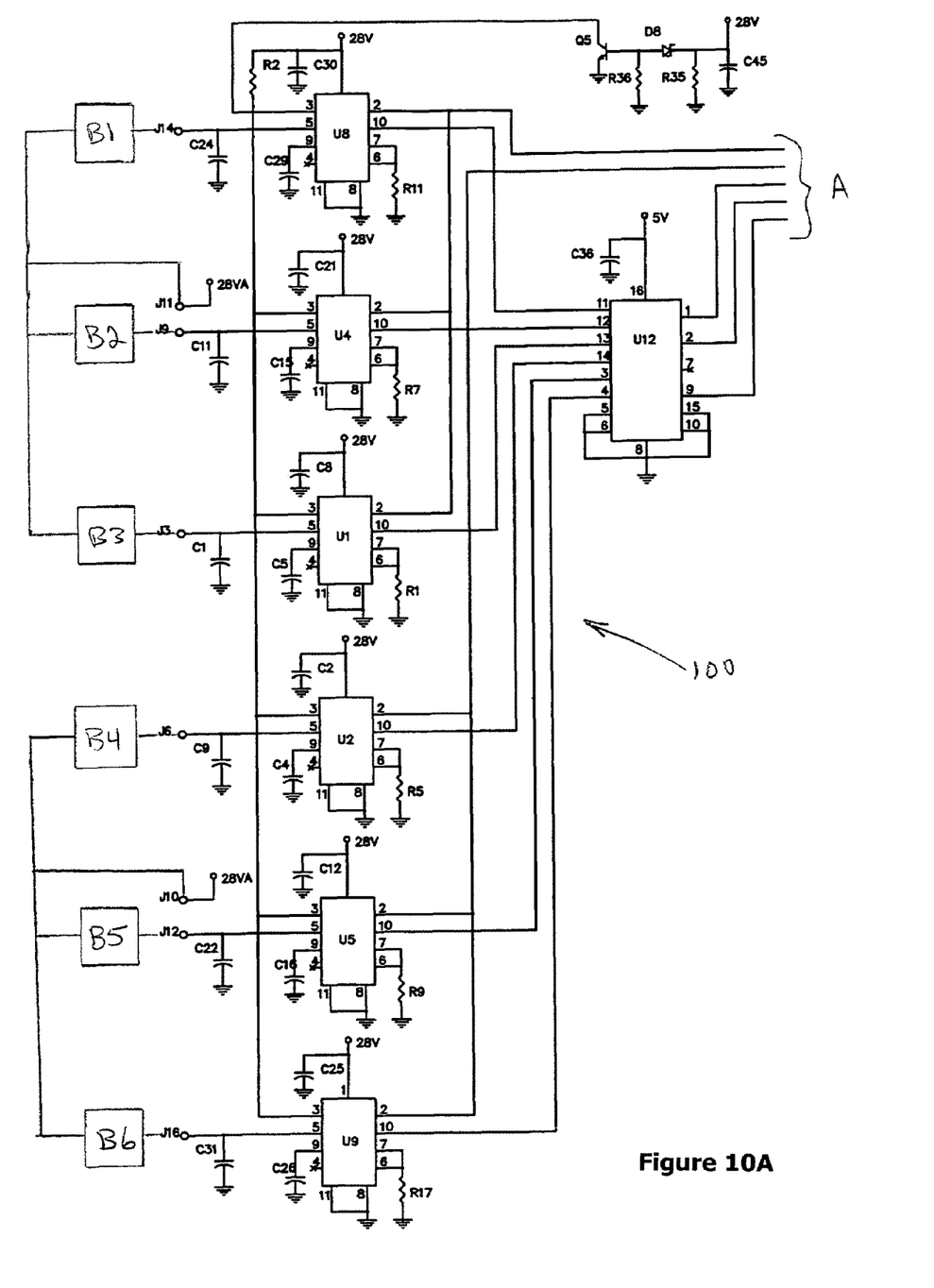
FIGS. 10A and 10B are schematics of a current source and control circuit for use in combination with the lighthead shown in FIGS. 6-9.
Figure 10B:
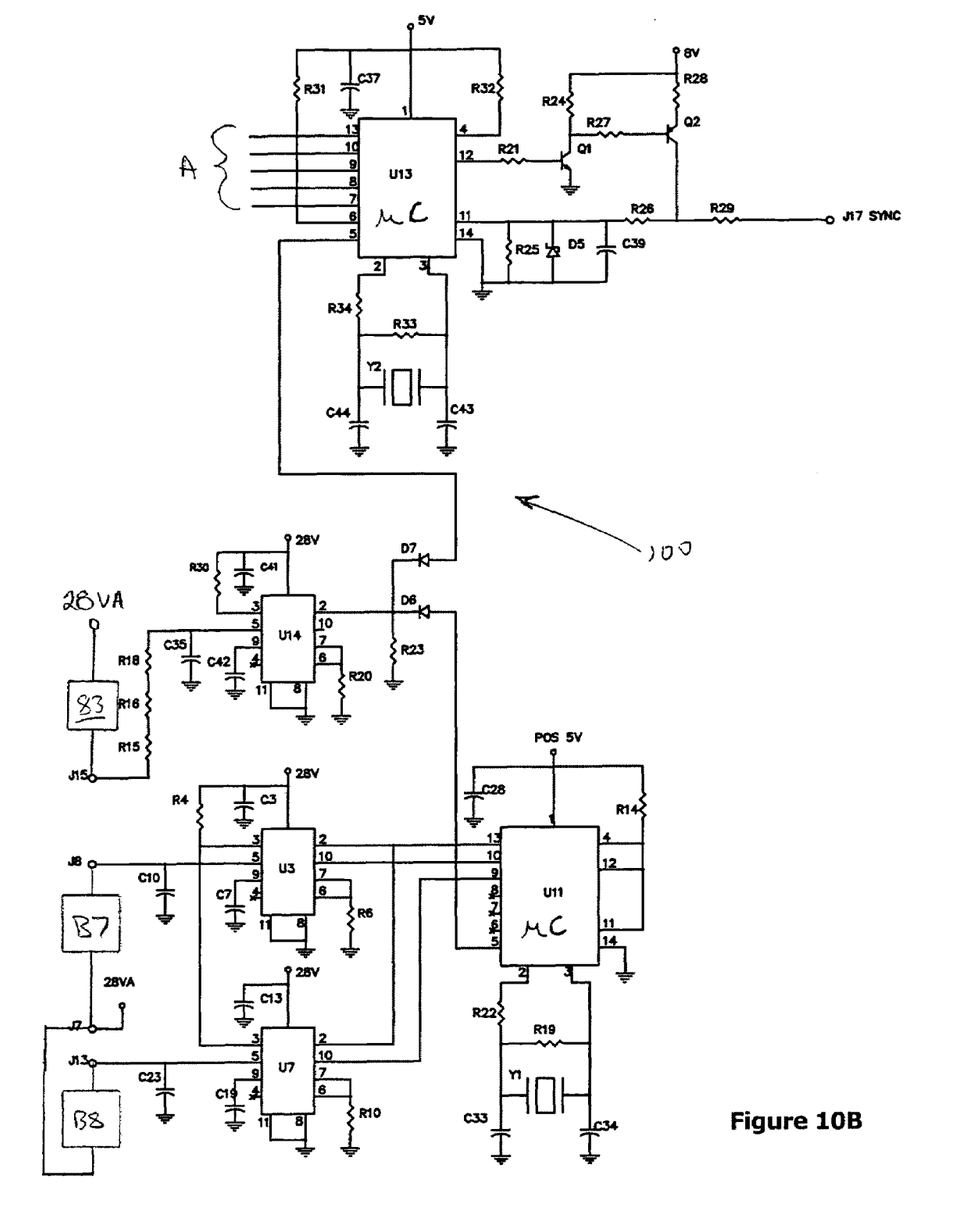

The lighthead 70 is connected to a current source 100 illustrated schematically in FIGS. 10A and 10B. The current source 100 includes two microprocessors, U11 dedicated to the position light function and U13 dedicated to the collision light function. Each microprocessor includes on board memory for storage of operating program code and data such as flash patterns. The 6 LED banks (B1, B2, B3, B4, B5, B6) dedicated to the anti-collision function are driven by 6 constant current sources U1, U2, U4, U5, U8 and U9, which are controlled by microprocessor U13. Constant current sources may be constructed from a voltage regulator and other components as shown in FIG. 2. In the disclosed alternative embodiment, the current source 100 employs integrated circuits (ICs) designed specifically to function as a constant current source with an enhanced feature set. Suitable constant current source ICs are commercially available. Each of the constant current sources includes a built-in diagnostic for detecting the status of the LED bank to which it is connected. A fault from a constant current source indicates that no current (or an unexpectedly low current) is flowing through the current source during a period when power is applied to the current source. The most common failure this arrangement is designed to detect is an open circuit failure of an LED lamp in the associated LED bank. Such a failure would necessarily extinguish the entire LED bank. It is important to note that the fault output (pin 10) of the constant current source ICs are active low, meaning that absence of a failure is indicated by a logic level high at the fault output (pin 10) of the constant current source IC. This configuration means that any failure of the constant current source IC which prevents a logic level high at the fault output will also be detected as a failure.

Each LED bank B1-B6 is connected between a source of electrical power and a constant current source U1, U2, U4, U5, U8, U9, which provides a sinking path for current through the LED bank when turned on. Current sources U1, U4 and U8 provide current to the anti-collision LED banks B1-B3 in one group (for example the LED lamps on PC board 78), while current sources U2, U5 and U9 provide current to the anti-collision LED banks B4-B6 in the other group (for example the LED lamps on PC board 79). Fault indications from the six current sources B1-B6 associated with the anti-collision function are fed through a parallel in/serial out shift register U12 to an input (pin 7) on the microcontroller U13 in FIG. 10B. The serial output of the shift register U12 is used by microcontroller U13 to identify the specific bank and group of LED lamps experiencing the failure.

The current applied to each LED bank is controlled by applying a pulse width modulated (PWM) signal to the PWM input (pin 2) of the associated constant current source IC. As best shown in FIG. 10A, the PWM inputs (pin 2) for the three constant current sources (U8, U4, U1) for a group of LED banks B1-B3 are tied together and connected to the same output (pin 13) of the microcontroller U13. The PWM inputs (pin 2) for the other three constant current sources (U2, U5, U9) are also tied together and are connected to a different output (pin 10) of the microcontroller U13. This arrangement allows the microcontroller U13 to independently control the current applied each group of LED banks. Current is increased to the remaining LED banks (in a group including a failed LED bank) by adjusting the PWM signal at the relevant output (pin 13 or pin 10) of the microcontroller U13. In the disclosed embodiment, microcontroller U13 is programmed to respond to one fault indication by increasing the current delivered to the remaining LED banks of the relevant group.

As shown in FIG. 10B, the disclosed anti-collision light circuit includes a synchronization input SYNC arranged to detect the condition of a synchronization line connecting multiple anti-collision lights. The condition of the SYNC input is used by the microcontroller to coordinate the flash pattern generated by the connected anti-collision lights. The operation of a synchronization circuit is described in U.S. Pat. No. 7,116,294 assigned to the assignee of the present disclosure, the entire contents of which are incorporated herein by reference.

As shown in FIG. 10B, the position light LED banks B7, B8 are driven by constant current sources U3 and U7, which are controlled by microcontroller U11. The functionality of the constant current sources U3 and U7 is the same as that described for the constant current sources driving the anti-collision light LED banks. The fault outputs (pin 10) of the constant current sources U3 and U7 are connected to inputs (pins 10 and 9) of the microcontroller U11. In the position light portion there are two LED banks B7, B8 (as described above), each configured to meet the position light illumination requirements if driven at their maximum safe operating current. In the absence of a detected failure, microcontroller U11 is programmed to apply a PWM signal to the constant current sources U3 and U7 which will apply a reduced current to the position light LED banks B7, B8. The reduced current is selected so that the LED lamps produce approximately one half (½) the luminous flux that they would if driven at their maximum safe operating current. In the event of one detected failure, the microcontroller is programmed to adjust the PWM signal applied to the remaining LED bank, increasing the effective current applied to the remaining LED bank.

PWM signals are typically described in terms of duty cycle. A PWM signal with a 50% duty cycle is on for one half and off for one half of each time period. The disclosed circuits employ PWM signals operating at 200 Hz, making the relevant time period 5 mS. A 50% duty cycle PWM signal in the disclosed embodiment is on for 2.5 mS and off for 2.5 mS in a repeating pattern. This PWM signal is applied to the PWM input (pin 2) of the constant current source during the period the relevant LED bank is to be illuminated. Position lights are required to be on continuously while the aircraft is in operation, so the PWM signal will be applied to the constant current sources U3 and U7 continuously. It will be understood that the constant current source will be applying corresponding 2.5 mS pulses of current to the position light LED banks. The anti-collision light LED banks generate a flashing light signal, so the PWM signal will be applied to the PWM input (pin 2) of the relevant constant current sources according to a predetermined pattern stored in microcontroller U13. The flash pattern is selected to comply with the FAR requirements, for example a 250 mS flash produced at a rate of 45 flashes per minute.

Each of the pulses generated by the constant current sources are at a pre-determined current corresponding to the maximum safe operating current to be applied to the LED banks at a 100% duty cycle. The current level generated by the disclosed constant current sources is set by a feedback resistor connected to a feedback input (pin 7) of the constant current source IC. In the 50% duty cycle example, the LED lamps in turn produce corresponding 2.5 mS bursts of light at an intensity corresponding to the applied current. The human eye and relevant light intensity measuring equipment averages these short pulses into a reduced level of light output (reduced illumination intensity) corresponding to a 50% reduction in applied current as is known in the art. The average of current pulses applied in a given period of time is the effective current applied to the LED bank.

It will be understood that the selected reduced current and the corresponding PWM signal duty cycle will be dependent upon the flux characteristics of the LED lamps. In other words, a 50% duty cycle may not correspond to a 50% reduction in luminous flux. According to aspects of the present disclosure, the current level generated by the constant current source ICs and the PWM duty cycle percentages applied in the normal operating and redundant modes are selected to ensure the LED aviation warning light complies with the relevant FAR at all times. The configurable constant current sources and programmable microcontrollers allow the disclosed LED aviation warning lights to be configured for particular components, locations and applications.

Figure 6:
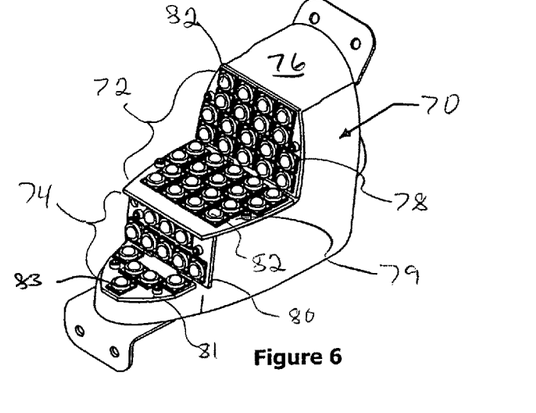
FIG. 6 is a perspective view of a lighthead configured to produce anti-collision and position warning light illumination.
Figure 7:
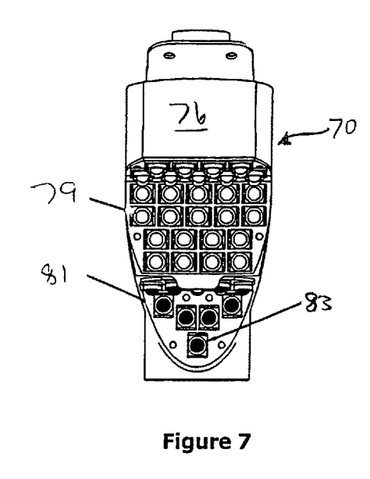
FIG. 7 is a top view of the lighthead of FIG. 6.
Figures 8, 9:
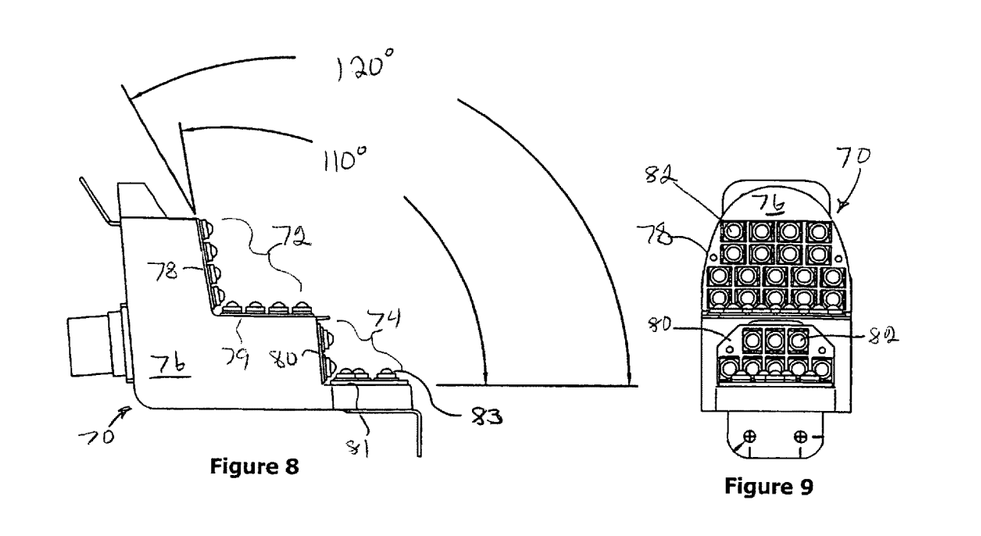
FIG. 8 is a side view of the lighthead of FIG. 6.
FIG. 9 is a front view of the lighthead of FIG. 6

The disclosed LED aviation warning light 70, 100 also provides a positive fault indication in the form of a fault indicator LED 83. In the disclosed lighthead 70, the fault indicator LED 83 is mounted on PC board 81 and isolated in its own row as best seen in FIGS. 6 and 7. The fault indicator LED 83 is selected to be distinct from the adjacent LED lamps to enhance its visibility to an inspector. This may be accomplished by making the fault indicator LED 83 of a contrasting color, for example amber, while the warning light LED lamps 82 are white, red or green. Visibility of the fault indicator LED may also be enhanced by causing the fault indicator LED lamp to flash in a distinctive pattern. Other fault indications are also possible, such as an electronic signal transmitted to other aircraft systems. A fault indicator signal may be transmitted wirelessly in response to a query. In a further alternative, an RFID device may be provided which transmits a warning light status when exposed to a compatible radio frequency.

Both microcontrollers U11 and U13 have an output (pin 5) dedicated to activating the fault indicator LED 83. As shown in FIG. 10B, the fault indicator outputs (pin 5) of the microcontrollers U11 and U13 are connected to the PWM input (pin 2) of the constant current source U14 which drives the fault indicator LED 83. In this arrangement, both microcontrollers U11 and U13 are provided with software that includes program steps which activate the fault indicator LED 83 when a failure is detected in any of the anti-collision or position light LED banks. The fault indicator LED may be activated in a steady or flashing mode, as determined by the programming of the microcontrollers U11 and U13.

The disclosed LED aviation warning lights are configured to detect a failure in any of the several LED banks employed to generate warning light signals. One or more microprocessors are programmed to take one or more predetermined failure mode actions in the event an LED bank failure is detected. In the alternative embodiment illustrated in FIGS. 6-13, one failure mode action is to increase the effective current delivered to the functional LED banks in a group of LED banks including a failed LED bank, e.g., the redundant mode. Another aspect of the failure mode is to activate the fault indicator LED 83. Other failure mode actions may include sending a fault indication to other systems of the aircraft or to inspection equipment configured for that purpose.

It is possible for more than one LED bank to fail in a group of LED banks arranged to meet the illumination requirements for a particular sector or zone of the illumination pattern required by the relevant FAR. In such a scenario, the reserve illumination capacity would be insufficient to make up for the loss of light generated by the second failed LED bank. This kind of failure may be described as a "compliance failure" because the LED warning light will no longer be in compliance with the relevant FAR. Embodiments of the disclosed LED warning light are configured to detect the location of the failed LED banks and determine whether multiple LED banks have failed in a particular group, resulting in a compliance failure. When multiple LED bank failures are detected in a particular group, the LED warning light is configured to enter into an alternate failure mode to prevent a non compliant LED warning light from remaining in service. In what may be referred to as a "compliance failure mode", an embodiment of the disclosed LED warning light is configured to shut down all LED banks and illuminate the fault indicator LED 83 in a pre-determined pattern that may be different from pattern applied to the fault indicator LED 83 in the redundant mode. For example, the fault indicator LED 83 may be continuously illuminated in the redundant mode and flashing in the compliance failure mode. In the compliance failure mode, the LED warning light is extinguished, providing an obvious visual indication of failure, supplemented by the flashing fault indicator LED 83.

The disclosed lighthead 70/current source 100 combination can compensate for failure of one bank of LEDs in each group, or in this case three banks of LEDs including a total of eighteen (18) LEDs, and remain in compliance with the relevant FAR. However, failure of only two banks of LEDs in any one group of LEDs will cause the disclosed LED warning light to enter a compliance failure mode, where the controller is configured to shut down the LED warning light.

The disclosed LED aviation warning light 70, 100 includes control logic configured to carry out the disclosed functions, including detecting LED bank failure and taking pre-determined failure mode actions. Failure mode actions include increasing the effective current applied to specific LED banks to ensure that the relevant FAR specification is still met and providing a positive failure indication as described above. For purposes of this application, control logic refers to hardware (e.g. logic circuits, a processor, or a combination thereof) software, or a combination of hardware and software. In the disclosed LED aviation warning light, control logic is provided by a combination of programmable microcontrollers, transistors, and other digital components such as constant current source ICs and shift registers.

The microcontrollers in the disclosed LED aviation warning lights are programmed with a software routine of the polling type. The software functions run in a continuous loop from within a main routine. Subroutines illustrated in the attached flow charts are queried by the main routine and decisions are made according to the results of the subroutines.

Figure 11:
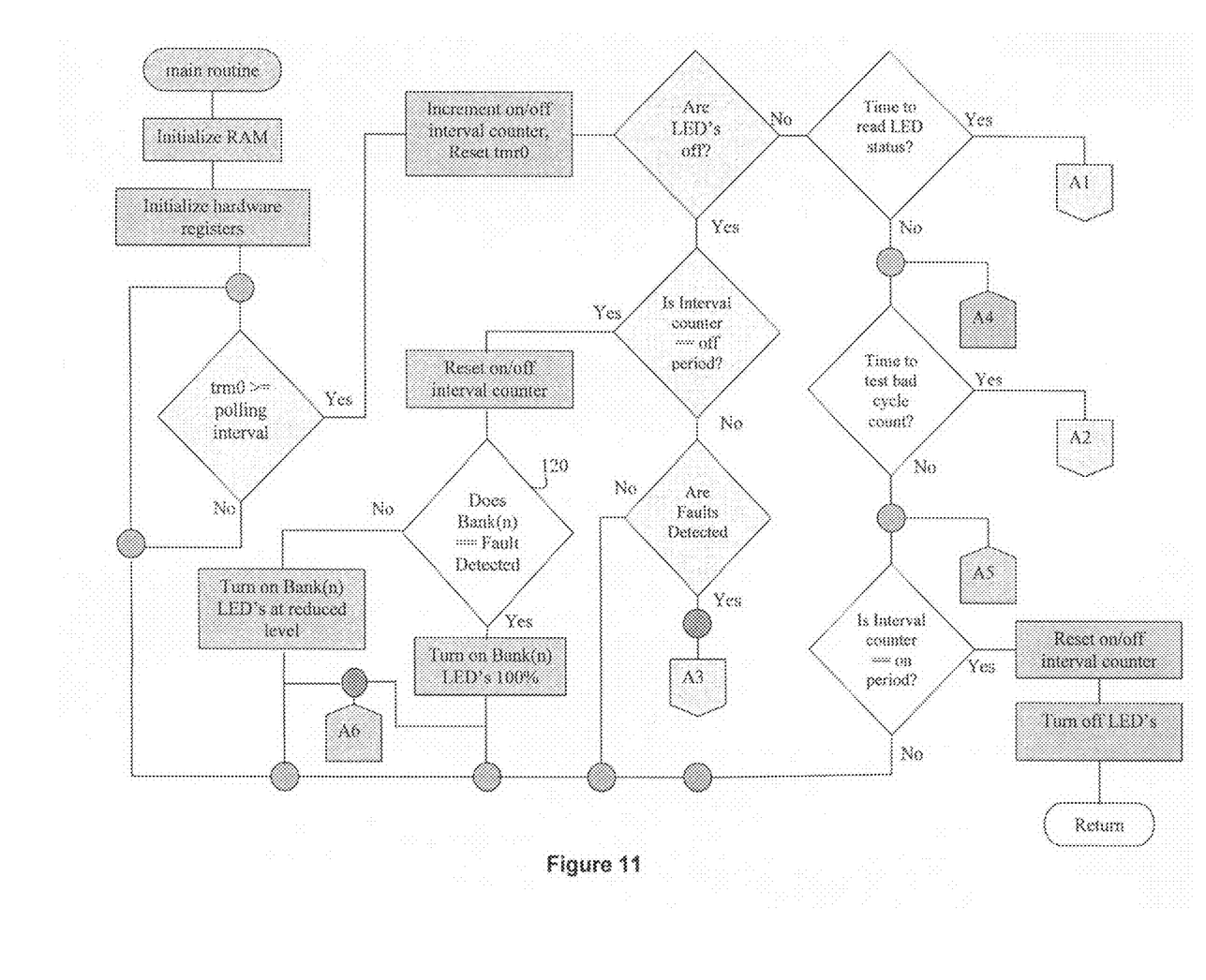
FIGS. 11 and 11A are a software flow chart for a microcontroller program for use in the control circuit of FIGS. 10A and 10B and a subroutine for use in conjunction with the main routine of FIG. 11, respectively.

FIG. 11 is a flow chart illustrating an alternative main routine for the LED aviation warning light illustrated in FIGS. 6-10B. The flow chart of FIG. 11 is a modified version of the flow chart shown in FIG. 3 and works in conjunction with the subroutines illustrated in FIGS. 4 and 5. The main routine illustrated in FIG. 11 operates substantially as described with respect to the flow chart illustrated in FIG. 3 and will be described in detail here only where its functionality is different. The main routine illustrated in FIG. 11 differs primarily with respect to how the LED banks are turned on, as illustrated in the lower left hand portion. FIG. 11 includes an additional decision when it is time to turn on the LEDs. At 120, the routine checks whether a fault is detected before turning on the LEDs. The fault detection inquiry depends on the outcome of subroutines A1 and A2 as previously described. If a fault is detected at 120, the main routine turns on the LED banks associated with the relevant output at a 100% duty cycle, activating the reserve illumination capacity as described above. If no fault is detected at 120, then the main routine turns on the LED banks at the pre-determined reduced PWM duty cycle percentage.

FIG. 11 illustrates a main routine suitable for the position light microcontroller U11. For the anti-collision light microcontroller U13, an additional step or subroutine is required to determine which group of LED banks is experiencing the failure, with the increased duty cycle percentage applied to that group. The additional steps or subroutine will evaluate the serial output of the shift register U12 to determine which group of LED banks includes a failed LED bank. The step "Turn on fault Indicator" in FIG. 11 may include activating the fault indicator LED 83 as described above, but may also include generating a fault signal for use by other aircraft systems or maintenance equipment as previously described.

Figure 11A:
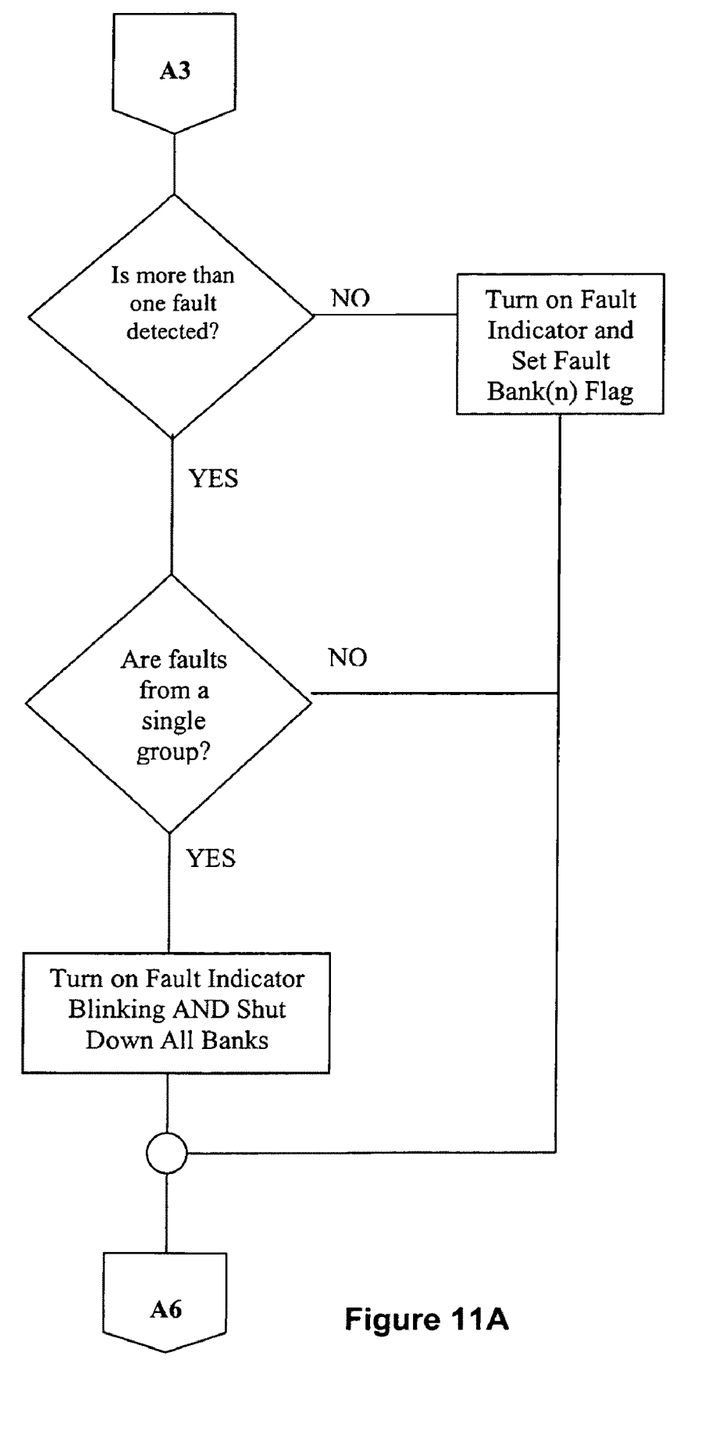

FIG. 11A illustrates a subroutine for use in conjunction with the main routine of FIG. 11. The subroutine illustrated in FIG. 11A sets forth representative program steps for shutting down the LED warning light in the event of more than one LED bank failure in a single group. If more than one fault is detected, the subroutine checks whether the faults originate from a single group of LEDs. As previously discussed, each group of LEDs in the disclosed lighthead 70 are arranged to meet the illumination requirements for a particular sector of the light pattern to be produced by the lighthead 70. The disclosed current source 100 is configured to compensate for the loss of one LED bank in any given group, but cannot compensate for the loss of two LED banks in the same group. If the subroutine of FIG. 11A determines that two fault indicators are received from the same group of LEDs, the program shuts down all LED banks and activates the fault indicator LED in a distinctive flashing pattern.

While various embodiments have been described above, it should be understood that they have been presented by way of example and not limitation. The breadth and scope of this patent should not be limited by any of the above described exemplary embodiments, but should be defined only in accordance with the following claims.

What is claimed is:

1. An LED warning light comprising:
   at least one group of LED lamps arranged to collectively produce an illumination pattern having an intensity exceeding predetermined values over a specified angular distribution, said at least one group of LED lamps divided into a plurality of LED banks, each LED bank comprising a plurality of LED lamps connected in series, said LED lamps having a luminance which is a function of a current applied to the LED lamp;
   a plurality of bank driver circuits, each bank driver circuit operatively connected to deliver current to one of said LED banks, each bank driver circuit sensing current flow through the LED bank to which it is connected and producing a fault output indicating failure of the LED bank, each said bank driver circuit responsive to an input signal to vary the current applied to the LED bank; and
   a controller operatively configured to receive said fault outputs and provide a first input signal to all said bank driver circuits corresponding to a first current in the absence of a fault output and a second input signal to all said bank driver circuits corresponding to a second current when a fault output is present,
   wherein said second current is selected to increase the luminance of the LED lamps in the LED banks other than said failed LED bank to compensate for the loss of luminance from the LED lamps in the failed LED bank.

2. The LED warning light of claim 1, wherein the LED lamps in said LED banks are arranged so that the illumination pattern generated by the LED banks other than the failed LED bank, when driven at said second current has an intensity exceeding said specified values over said specified angular distribution.

3. The LED warning light of claim 1, wherein the controller is responsive to more than one fault output to terminate said input signals, thereby shutting off all said LED banks.

4. The LED warning light of claim 1, wherein the controller is configured to turn on a fault indicator when a fault output is present.

5. The LED warning light of claim 3, wherein the controller is configured to flash a fault indicator when more than one fault output is present.

6. The LED warning light of claim 1, wherein said at least one group of LED lamps comprises a plurality of groups of LED lamps, each said group of LED lamps arranged to produce an illumination pattern for a sector of an illumination pattern to be provided by said LED warning light.

7. The LED warning light of claim 6, wherein said controller is configured to use the source of a fault output to determine which of said groups of LED lamps includes a failed LED bank and to apply said second input signal to the bank driver circuits of said group of LED banks including the failed LED bank.

8. An LED warning light comprising:
   a plurality of light-emitting diodes (LEDs) arranged in two or more groups of LEDs, each group of LEDs configured to emit a pattern of light having a predetermined intensity and distribution, each group of LEDs including a plurality of LED banks, each LED bank comprising a plurality of LEDs connected in series, said LEDs having a luminance which is a function of applied current;
   a plurality of bank drivers, each bank driver connected to deliver current to one of said LED banks, each bank driver producing a fault output indicating failure of the LED bank to which it is connected and responsive to an input signal to vary the current applied to the LED bank;
   a controller configured to apply a first applied current to said bank drivers in the absence of a fault output and a second applied current to the bank drivers of a group of LEDs that is the source of a fault output,
   wherein said second applied current is selected to increase the luminance of the LEDs in the LED banks in the group including a failed LED bank to compensate for the loss of luminance from the LEDs in the failed LED bank.

9. The LED warning light of claim 8, where in said controller is configured to relate fault outputs to the group of LEDs containing a failed LED bank and shut down the LED warning light in response to more than one fault output from a single group of LEDs.

10. The LED warning light of claim 8, wherein each said bank driver monitors the current flow through the LED bank to which it is connected and produced said fault output if abnormal current flow is detected.

11. The LED warning light of claim 10, wherein abnormal current flow is the absence of current flow.

12. The LED warning light of claim 8, comprising a fault indicator LED selected to emit light of a color contrasting with the color of light emitted by the LEDs in said groups of LEDs,
   wherein said controller is configured to apply current to said fault indicator LED when a fault output is present, resulting in an illuminated fault indication.

13. The LED warning light of claim 8, wherein said controller is configured to allow one fault output from each group of LEDs and when more than one fault output is detected from a group of LEDs, said controller is configured to shut down the LED warning light.

14. An LED warning light comprising:
   two or more groups of LEDs, each group of LEDs including a plurality of LED banks, each LED bank comprising:
      a plurality of LEDs connected in series; and
      a bank driver circuit arranged to deliver current to said plurality of LEDs, said current being variable according to the duty cycle of a PWM input signal, monitor one or more operational parameter of said plurality of LEDs and produce a fault output when said one or more operational parameter indicates failure of at least one LED in said plurality of LEDs;
   a controller operatively connected to generate the PWM input signal to said bank drivers and receive said fault outputs, said controller configured to increase the current applied to the LEDs in the LED banks in a group of LEDs that is the source of a fault output by altering the duty cycle of the input signal delivered to bank driver circuits in the group of LEDs that is the source of a fault output.

15. The LED warning light of claim 14, wherein said at least one operational parameter is current through said plurality of LEDs and said indication of failure is absence of said current.

16. The LED warning light of claim 14, wherein each group of LEDs is configured to emit a pattern of light having a pre-determined intensity and distribution, said LEDs have a luminance that is a function of current and the increase in current applied to the LEDs in the group of LEDs that is the source of a fault output results in an increase in luminance from LEDs in the group of LEDs that is the source of the fault output sufficient to compensate for the loss of luminance from the LEDs in a failed LED bank in that group of LEDs.

17. The LED warning light of claim 14, comprising a fault indicator LED selected to emit light of a color contrasting with the color of light emitted by the LEDs in said groups of LEDs,
    wherein said controller is configured to apply current to said fault indicator LED when a fault output is present, resulting in an illuminated fault indication.

18. The LED warning light of claim 14, wherein said controller is configured to allow one fault output from each group of LEDs and when more than one fault output is detected from a group of LEDs, said controller is configured to shut down the LED warning light.

\* \* \* \* \*